(12) United States Patent
Morten et al.

(10) Patent No.: US 9,609,279 B2
(45) Date of Patent: Mar. 28, 2017

(54) METHOD AND SYSTEM FOR PROVIDING SECURE CODECS

(75) Inventors: Glenn A. Morten, Bellevue, WA (US);
Tomás E. Palmer, Redmond, WA (US);
Charles D. MacLean, Claremont, CA (US)

(73) Assignee: Google Inc., Mountain View, CA (US)

( * ) Notice: Subject to any disclaimer, the term of this patent is extended or adjusted under 35 U.S.C. 154(b) by 2644 days.

(21) Appl. No.: 11/230,291

(22) Filed: Sep. 19, 2005

(65) Prior Publication Data

US 2006/0069649 A1   Mar. 30, 2006

Related U.S. Application Data

(60) Provisional application No. 60/612,757, filed on Sep. 24, 2004.

(51) Int. Cl.
| | |
|---|---|
| *G06F 21/00* | (2013.01) |
| *H04N 7/167* | (2011.01) |
| *H04N 7/173* | (2011.01) |
| *H04N 21/4363* | (2011.01) |
| *H04N 21/4367* | (2011.01) |

(Continued)

(52) U.S. Cl.
CPC .......... *H04N 7/1675* (2013.01); *G06F 21/00* (2013.01); *H04L 9/3247* (2013.01); *H04L 9/3263* (2013.01); *H04N 7/173* (2013.01); *H04N 21/4367* (2013.01); *H04N 21/43637* (2013.01); *H04N 21/4405* (2013.01);
(Continued)

(58) Field of Classification Search
None
See application file for complete search history.

(56) References Cited

U.S. PATENT DOCUMENTS

| 4,535,355 A | 8/1985 | Arn et al. |
| 4,694,489 A | 9/1987 | Frederiksen |

(Continued)

FOREIGN PATENT DOCUMENTS

| EP | 658054 B1 | 6/1995 |
| EP | 714204 B1 | 5/1996 |

(Continued)

OTHER PUBLICATIONS

Cheng, H.C.H., "Partial Encryption for Image and Video Communication", Department of Computing Science, University of Alberta, pp. 1-87, Fall, 1998.

(Continued)

*Primary Examiner* — Tsan-Yu J Huang
(74) *Attorney, Agent, or Firm* — Fenwick & West LLP

(57) ABSTRACT

A system and method is arranged to provide compression and decompression of digital content in a secure manner. The system is configured to authenticate a source of the digital content, and to further determine a consumer's entitlements and rights for access to the digital content. Based upon the determined entitlements and rights for access, the system is directed to decrypt, and decompress the digital content. In one embodiment, a component of the system is enabled to establish a trust relationship with at least one other component of the system, to minimize an opportunity for piracy of the digital content. In another embodiment, a secure clock is directed to provide protection against hackers that may employ an in-circuit emulator, or the like.

19 Claims, 4 Drawing Sheets

(51) Int. Cl.
*H04N 21/4405* (2011.01)
*H04N 21/4627* (2011.01)
*H04N 21/8355* (2011.01)
*H04L 9/32* (2006.01)

(52) U.S. Cl.
CPC ..... *H04N 21/4627* (2013.01); *H04N 21/8355* (2013.01); *H04L 2209/605* (2013.01)

(56) References Cited

U.S. PATENT DOCUMENTS

| | | | |
|---|---|---|---|
| 5,067,035 A | 11/1991 | Kudelski et al. | |
| 5,134,656 A | 7/1992 | Kudelski | |
| 5,144,663 A | 9/1992 | Kudelski et al. | |
| 5,339,413 A | 8/1994 | Koval et al. | |
| 5,375,168 A | 12/1994 | Kudelski | |
| 5,487,167 A | 1/1996 | Dinallo et al. | |
| 5,524,073 A * | 6/1996 | Stambler | 705/75 |
| 5,539,450 A | 7/1996 | Handelman | |
| 5,590,200 A | 12/1996 | Nachman et al. | |
| 5,592,212 A | 1/1997 | Handelman | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,796,828 A * | 8/1998 | Tsukamoto et al. | 380/203 |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,949,879 A | 9/1999 | Berson et al. | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,061,451 A * | 5/2000 | Muratani et al. | 380/201 |
| 6,073,256 A | 6/2000 | Sesma | |
| 6,112,181 A | 8/2000 | Shear et al. | |
| 6,138,119 A | 10/2000 | Hall et al. | |
| 6,157,721 A | 12/2000 | Shear et al. | |
| 6,160,891 A | 12/2000 | Al-Salqan | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,618 B1 * | 5/2001 | Downs et al. | 705/51 |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelmann et al. | |
| 6,311,221 B1 | 10/2001 | Raz et al. | |
| 6,314,409 B2 | 11/2001 | Schneck et al. | |
| 6,314,572 B1 | 11/2001 | LaRocca et al. | |
| 6,334,213 B1 | 12/2001 | Li | |
| 6,363,488 B1 | 3/2002 | Ginter et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,516,357 B1 | 2/2003 | Hamann et al. | |
| 6,587,561 B1 | 7/2003 | Sered et al. | |
| 6,591,420 B1 * | 7/2003 | McPherson et al. | 725/29 |
| 6,618,484 B1 | 9/2003 | Van Wie et al. | |
| 6,629,243 B1 | 9/2003 | Kleinman et al. | |
| 6,633,918 B2 | 10/2003 | Agarwal et al. | |
| 6,634,028 B2 | 10/2003 | Handelmann | |
| 6,640,304 B2 | 10/2003 | Ginter et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,792,113 B1 | 9/2004 | Ansell et al. | |
| 2002/0001385 A1 | 1/2002 | Kawada et al. | |
| 2002/0015498 A1 | 2/2002 | Houlberg et al. | |
| 2002/0018566 A1 | 2/2002 | Kawatsura et al. | |
| 2002/0021805 A1 | 2/2002 | Schumann et al. | |
| 2002/0089410 A1 | 7/2002 | Janiak et al. | |
| 2002/0104004 A1 | 8/2002 | Couillard | |
| 2002/0108037 A1 | 8/2002 | Baker | |
| 2002/0112171 A1 * | 8/2002 | Ginter et al. | 713/185 |
| 2002/0120465 A1 * | 8/2002 | Mori et al. | 705/1 |
| 2002/0141582 A1 | 10/2002 | Kocher et al. | |
| 2003/0004661 A1 * | 1/2003 | Burns et al. | 702/61 |
| 2003/0007568 A1 | 1/2003 | Hamery et al. | |
| 2003/0191968 A1 * | 10/2003 | Yokota et al. | 713/201 |
| 2003/0217275 A1 | 11/2003 | Bentley et al. | |
| 2004/0010467 A1 * | 1/2004 | Hori et al. | 705/50 |
| 2004/0010602 A1 | 1/2004 | Van Vleck et al. | |
| 2004/0049687 A1 * | 3/2004 | Orsini et al. | 713/189 |
| 2004/0117500 A1 | 6/2004 | Lindholm et al. | |
| 2004/0119814 A1 * | 6/2004 | Clisham et al. | 348/14.08 |
| 2004/0184616 A1 | 9/2004 | Morten | |

FOREIGN PATENT DOCUMENTS

| | | |
|---|---|---|
| EP | 0886409 A2 | 12/1998 |
| JP | 2003 272286 | 9/2003 |
| TW | 501376 B | 9/2002 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | 00/30292 | 5/2000 |
| WO | WO-01/35571 A1 | 5/2001 |
| WO | 01/41443 A1 | 6/2001 |
| WO | 01/65342 A1 | 9/2001 |
| WO | WO-01/93212 A2 | 12/2001 |
| WO | WO-02/21761 A2 | 3/2002 |
| WO | 02/080490 A2 | 10/2002 |
| WO | WO-2004/002112 A1 | 12/2003 |

OTHER PUBLICATIONS

Blumenfeld, Steven, "System Security, Streaming Media", Broadcast Engineering magazine, pp. 1-2, Oct. 2001.

(56) References Cited

OTHER PUBLICATIONS

Griwodz, Carsten, "Video Protection by Partial Content Corruption", Multimedia and Security Workshop at ACM Multimedia, Bristol, UK, pp. 1-5, Sep. 1998.
Schulzrinne, H., et al., Real Time Streaming Protocol (RTSP), RFC 2326, pp. 1-86, Apr. 1998.
Hunter, J., et al., "A Review of Video Streaming Over the Internet", DSTC Technical Report TR97-10, pp. 1-28., Aug. 1997.
Eskiciouglu, A. and Delp, E., "An overview of multimedia content protection in consumer electronics devices", SP:IC, 16(7): pp. 681-699, Apr. 2001.
Yoshida, Kazuhiro, et al., "A Continuous-media Communication Method for Minimizing Playback Interruptions", IS&T/SPIE Conference on Visual Communications and Image Processing, SPIE, vol. 3653, pp. 748-757, Jan. 1999.
Omneon Video Networks Product Announcement, "Broadband Streaming Omneon and BSkyB", TB-1006-1, pp. 1-4.
"Irdeto Access & Optibase create Strategic Alliance", Press Release, Optibase, pp. 1-4, Dec. 14, 2000. http://www.irdetoaccess.com/press/0000041.htm.
"Establishing Interconnectivity among Various Makers' Products through Standardizatin of VOD Protocol", NTT Corporation Press Release, Sep. 27, 2002. http://www.ntt.co.jp/news/news02e/0209/020927.html.
Hanushevsky, A. and Cowles, R., "Virtual Smart Card", Stanford Linear Accelerator Center, pp. 1-12, Dec. 13, 2002.
Baker, Brian, et al., "Taking a DIFFERENT path—The application of virtual smart card technology to interactive TV", Communications Engineering & Design, pp. 1-5, Aug. 3, 2003. http://testced.cahners1.com/ced/2003/0803/08b.htm.
Balthrop, Justin, et al., "Coverage and Generalization in an Artificial Immune System", Proceedings of Genetic and Evolutionary Computation Conference (GECCO), pp. 1-8, 2002.
Spanos, George, et al., "Performance Study of a Selective Encryption Scheme for the Security of Networked, Real-Time Video", Proceedings of the 4th ICCN, Las Vegas, NV, pp. 2-10, Sep. 1995.
Griwodz, Carsten et al., "Protecting VoD the Easier Way", ACM Multimedia, Bristol, UK, pp. 21-28, 1998.
"Irdeto Access & Optibase create Strategic Alliance", Press Release, Optibase, pp. 1-2, Dec. 14, 2000. http://www.optibase.com/html/news/December__14__2000.html.
Intelligent Systems for Finance and Business, Goonatilake, Suran, ed. et al., Chapters 2-10, pp. 31-173, 1995.
Forrest, S., "Research Projects", pp. 1-3, Dec. 2, 2003. http://www.cs.unm.edu/~forrest/projects.html.
Schulzrinne, H., et al., "TRP: A Transport Protocol for Real-Time Applications", RFC 1889, pp. 1-75, Jan. 1996.
Taiwanese Search Report for R.O.C. Patent Application No. 94132827 dated Oct. 23, 2007 (3 pages).
Supplementary European Search Report for European Application Serial No. 05799669.6, mailed on Jan. 29, 2008. 2 pages.
Wu, Tsung-Li et al., "Selective Encryption and Watermarking of MPEG Video (Extended Abstract)," Feb. 17, 1997, 10 pgs., International Conference on Image Science, Systems, and Technology.
European Examination Report, European Application No. 05799669.6, Oct. 27, 2008, 4 pages.
PCT International Search Report, PCT Application No. PCT/US2005/033616, May 23, 2007, 3 pages.
PCT Written Opinion, PCT Application No. PCT/US2005/033616, May 23, 2007, 3 pages.

\* cited by examiner

METHOD AND SYSTEM FOR PROVIDING SECURE CODECS

CROSS-REFERENCE TO RELATED APPLICATIONS

This application claims the benefit of U.S. Provisional Application Ser. No. 60/612,757 entitled "Method and System for Providing Secure CODECS," filed on Sep. 24, 2004, the benefit of the earlier filing date of which is hereby claimed under 35 U.S.C. §119 (e) and which is further incorporated herein by reference.

FIELD OF THE INVENTION

The present invention relates to digital copy protection, and more particularly to a system and method for providing a secure digital Compresser/DECompresser (CODEC).

BACKGROUND OF THE INVENTION

Recent improvements in telecommunications and the electronic industry, and, in particular, advances in digital compression techniques, have led to increased availability of digital content to a consumer. For example, such advances have provided music, movies, videos-on-demand, and interactive television (iTV) to consumers by employing a compresser/decompresser (CODEC) to compress the digital audio and video content, and then to decompress the transmitted compressed content at a consumer's receiver.

With the increased availability of digital content over a network, however, content owners and providers have seen an increase in intellectual property theft. Such theft may arise at any place that the content is exposed. Exposure may arise virtually anywhere along a market stream between the content owner, provider, and the consumer, and even at the consumer's location. Without appropriate protection, the content can be illicitly intercepted, stolen, copied, and redistributed, thus depriving content owners and providers of their profits.

In fact, the Motion Picture Association of America (MPAA) estimates that the industry loses billions of dollars to movie piracy each year. The music industry has also seen major dollar loses due to such activates as hacking, spoofing, and file sharing. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
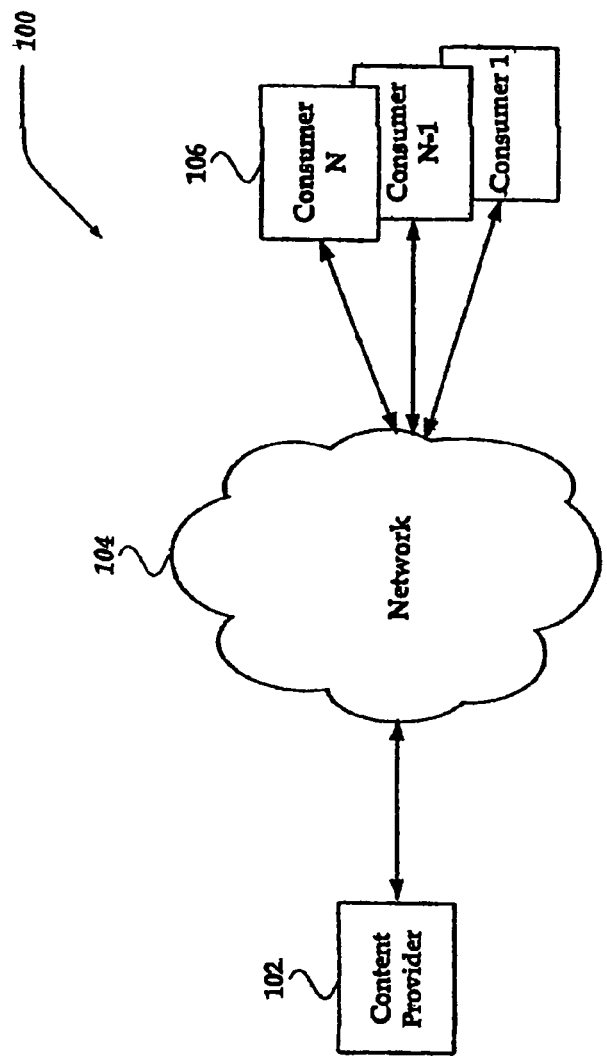
FIG. 1 is a functional block diagram illustrating an exemplary operating environment in which the invention may be implemented.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The phrase "in one embodiment" as used herein does not necessarily refer to the same embodiment, though it may. The phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "rights" typically refers to a set of one or more actions that may be performed with the content. Such rights may be derived from the content owner and include what a content distributor may do with the content and/or what a consumer may do with the content. In one embodiment, a content distributor may obtain the rights to distribute the content. However, the content distributor may also have other rights associated with the content as well. The content owner may also prescribe what the consumer may do with the content (i.e., what rights the user may have to the content).

A set of allowed actions may be different for different types of "users." For example, operators may have different rights than other users or than those users that may have acquired additional rights. In one embodiment, a typical content distributor may have rights to content that may include, but is not limited to, a right to broadcast the content one time no earlier than a determined date/time 1 or later than a determined date/time 2, to broadcast content some number of times no earlier than date/time 1 or later than date/time 2, to broadcast content some number of times at any date/time, to broadcast content any number of times, to "sell" to consumers content no earlier than date/time 1 or later than date/time 2, or the like. In one embodiment, a payment may be associated with obtaining a set of rights.

A typical set of rights to content for a user may include, but is not limited to a right to view the content now; to view the content one time, some predetermined number of times, or an unlimited number of times; a right that restricts the user to making no, one, or some predetermined number of copies of the content; to view the content based on a predetermined date/time, or the like.

The term "entitlements," may describe a set of one or more rights sent from the content distributor (such as a cable, satellite, or telecommunications operator) to a consumer or user over a distribution network. Entitlements may include all or a subset of the rights provided by the content owner. In one embodiment, user entitlements may include, but are not limited to, being entitled to view content now; view the content one time, or some number of times, or an unlimited number of times; to make no, one, or some number of, or any number of copies of the content; to view the content before a specified date/time; to view the content no sooner than a specified date/time; to view only on a specific device, some number of devices, or an unlimited number of devices; to view the content only on display devices connected via an analog cable or the like; to view the content on a display connected via a digital cable if a secure channel exists to the display device; or the like.

The present invention is directed at addressing the above-mentioned shortcomings, disadvantages and problems, and will be understood by reading and studying the following specification.

Briefly stated, the present invention is directed to a system and method of providing compression and decompression of digital content in a secure manner. The system enables content providers to deliver broadcast, video on demand, and similar digital content in a secure manner to a consumer. The system is configured to receive the digital content, authenticate a source of the digital content, and to further determine a consumer's entitlements and rights for access to the digital content. Based upon the consumer's access entitlements and rights, the system decrypts, and decompresses the digital content. In one embodiment, a component of the system establishes a trust relationship with another component, to minimize an opportunity for piracy of the digital content. In another embodiment, a secure clock is directed to provide protection against hackers that may employ an in-circuit emulator, or the like.

Illustrative Environment

FIG. 1 is a functional block diagram illustrating an exemplary operating environment in which the invention may be implemented. As shown in the figure, operating environment 100 includes content provider 102, network 104, and consumer(s) 106 (1 through N). Content provider 102 is in communication with consumer(s) 106 (1 through N), through network 104.

Operating environment 100 may include many more components than those shown in FIG. 1. However, the components shown are sufficient to disclose an illustrative embodiment for practicing the present invention. Moreover, operating environment 100 is only one example of a suitable operating environment and is not intended to suggest any limitation as to the scope of use or functionality of the present invention.

Content provider 102 may include businesses that are directed at providing digital content to consumer(s) 106. Content provider 102 may include businesses that provide and manage an infrastructure between consumer(s) 106 and the service operator's facilities. Content provider 102 may also include content owners such as producers, developers, and owners of digital content that can be distributed to consumer(s) 106. Content provider 102 may further include distributors and other businesses that obtain rights to distribute digital content from an upstream content owner (not shown). As such, content provider 102 may obtain the rights to distribute digital content from one or more content owner. Content provider 102 may also repackage, store, and schedule digital content for subsequent sale or license to other content providers (not shown).

Such digital content may include pay-for-view or time and subscription television, movies, interactive video games, interactive television, catalogue browsing, distance learning, video conferencing, and the like. It is apparent that digital content is not limited to video content only, and may include audio only services, without departing from the scope or spirit of the present invention. Thus, digital content is intended to include, but not limited to broadcast, video on demand, audio, video, still images, text, graphics, and the like. Moreover, content provider 102 may provide digital content in a compressed, or encoded, format directed to improve its transfer through network 104. Content provider 102 may also select to provide digital content in a secure manner to consumer(s) 106, necessitating a consumer to acquire appropriate entitlements or rights to access the digital content. Furthermore, content provider 102 may choose to provide digital content such as public television, radio, and the like, as unencrypted and "in the clear."

As such Content provider 102 may employ a variety of devices, and mechanisms to communicate digital content. Such devices include, but are not limited to, personal computers, desktop computers, multiprocessor systems, microprocessor-based or programmable consumer electronics, network PCs, servers, and the like. Content provider 102 may also employ a variety of communication transmission mechanisms, including but not limited to television, radio transmitters, satellite transmitter/receivers, or the like. In one embodiment, content provider 102 may employ a secure system for employing secure CODECs, such as described below in conjunction with FIG. 2.

Consumer(s) 106 may include end-users, consumers, or the like, of digital content. Consumer(s) 106 may employ various devices to enjoy the digital content, including but not limited to television appliances, digital recorders, set-top boxes (STB), cellular phones, mobile devices, personal digital assistants (PDAs), personal computers, jukeboxes, and the like. Consumer(s) 106 may request digital content delivery directly from content provider 102. Moreover, consumer(s) 106 may receive digital content through multiple sources within the market stream. Additionally, consumer(s) 106 may select to transfer or share digital content between other consumers.

Network 104 is configured to couple one computing device with another computing device. Network 104 may be enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 104 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 104 may also include an autonomous system of terminals, gateways, routers, and the like connected by wireless radio links, and the like. These connectors may be configured to move freely and randomly and organize themselves arbitrarily, such that the topology of network 104 may change rapidly.

Network 104 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 104 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 104 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media. Carrierless AM/PM (CAP), Discrete Multitone Transmission (DMT), and Frequency Division Multiplexing (FDM) may also be included as modulation techniques employed to generate the modulated data signal to transport digital content through operating environment 100 of FIG. 1.

Figure 2:
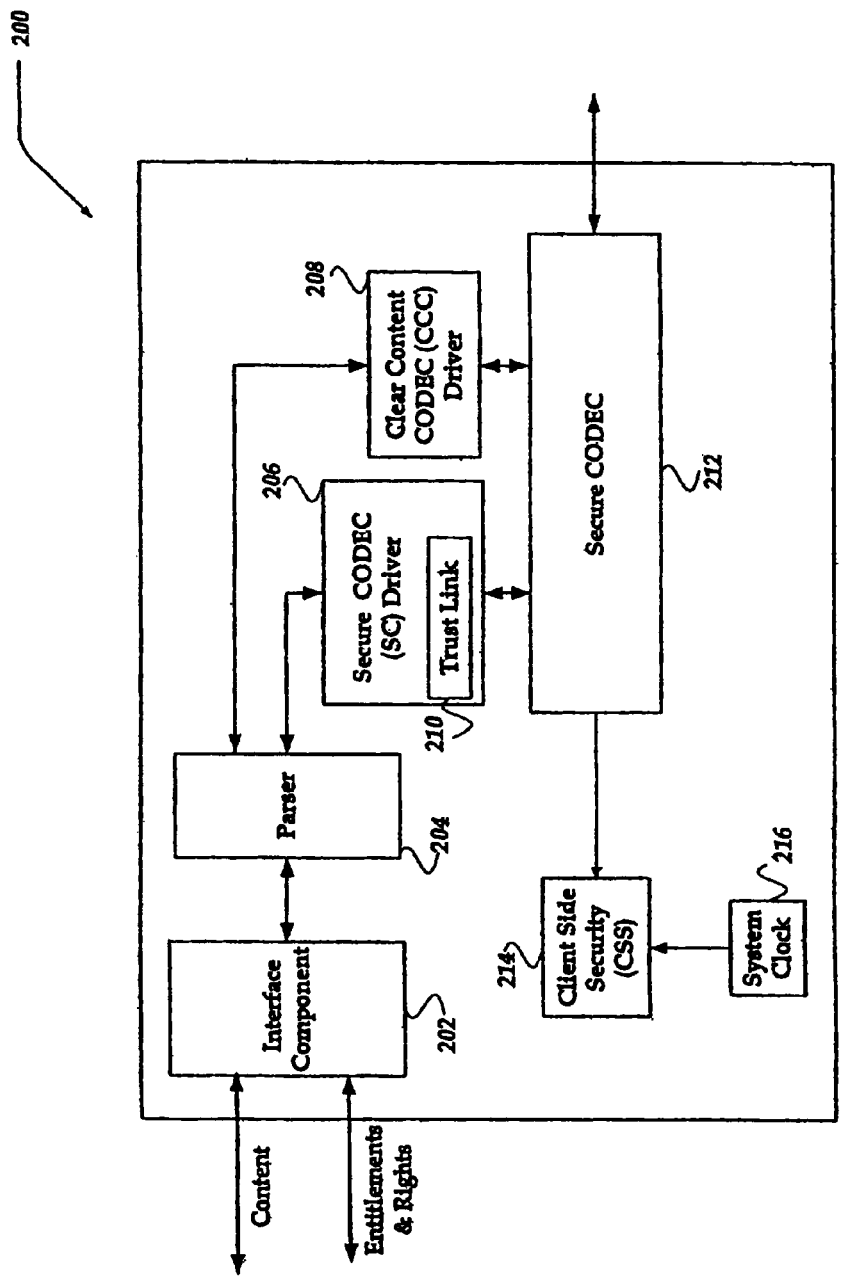
FIG. 2 is a functional block diagram of an embodiment of a system for employing a secure CODEC.

FIG. 2 is a functional block diagram of an embodiment of a secure system for employing a secure compresser/decompresser (CODEC). System 200 is configured to receive digital content; entitlements, and rights associated with the received digital content; and to authenticate the source of the digital content. System 200 is further configured to decrypt, and decompress the digital content based on the received entitlements and rights. As such, system 200 may be employed by consumer(s) 106 within, or coupled to a television appliance, digital recorder, set-top box, cellular phone, mobile device, PDA, personal computer, jukebox, hybrid Internet-music-player/home-stereo-component-system, or the like. Additionally, system 200 may be employed to illustrate a component of content provider 102.

As shown in FIG. 2, system 200 includes interface component 202, parser 204, Secure CODEC (SC) driver 206, Clear Content CODEC (CCC) driver 208, secure CODEC 212, client side security (CSS) 214, and system clock 216. Additionally, secure CODEC driver 206 includes trust link 210. System 200 may include many more components than those shown in FIG. 2. However, the components shown are sufficient to disclose an illustrative embodiment for practicing the present invention.

Interface component 202 is in communication with parser 204. Parser 204 is in communication with SC driver 210, and CCC driver 208. SC driver 210 and CCC driver 208 are in communication with secure CODEC 212. CSS 214 is in communication with secure CODEC 212 and system clock 216.

Interface component 202 may include network interface cards (NICs), mobile interface cards, digital versatile disc (DVD) interfaces, file system interfaces, or another other mechanism configured to couple system 200 to network 104 of FIG. 1, and manage the exchange of digital content, entitlements, and rights between content provider 102 and consumer 106. Interface component 202 is sometimes also known as a transceiver.

Parser 204 may be configured to analyze information received from interface component 202 and to determine if the information is secured content, entitlements, rights, or digital content communicated "in the clear." Parser 204 may be further configured to communicate secured content, entitlements and rights to SC driver 206, and digital content "in the clear" to CCC driver 208. Parser 204 may also be configured to receive digital content from SC driver 206, and CCC driver 208 and to combine or multiplex the digital content for communication upstream to content provider 102.

Secure CODEC (SC) driver 206 may be configured to enable secure clients, such as an interactive Television (iTV) client, secure applications, such as parser 204, and the like to communicate with Secure CODEC 212. In one embodiment, SC driver 206 is implemented as a software driver configured to securely link Secure CODEC 212 with an operating system.

Clear Content CODEC (CCC) driver 208 may be configured to enable clients, such as an iTV client, parser 204, unprotected clients, and the like, to communicate with unprotected aspects of Secure CODEC 212.

Trust link 210 may be configured to establish a trust relationship. A "trust relationship" refers to an establishment of authentication between two devices, components, or parties transferring information. A trust relationship may also provide information protection for traffic between the components. Trust link 210 may enable a trust relationship between components through various security mechanisms such as public/private key pairs, X.509 public key certificates, shared secret keys, or the like. Virtually any form of encryption/decryption mechanism may be employed, however. Such mechanisms may include, but not be limited to, Advanced Encryption Standard (AES), RC6, International Data Encryption Algorithm (IDEA), Data Encryption Standard (DES), Triple DES, PGP, or the like.

Thus, trust link 210 may enable communications between components that share a mutual trust relationship to communicate through encrypted communications. The encrypted communications may employ the same or different mechanism used to establish the trust relationship. Thus, in one embodiment, a trust relationship may be established using, for example, a public/private key, but then a mutually agreed upon private or shared secret key may be employed to encrypt/decrypt the shared communications.

Moreover, although trust link 210 is illustrated in SC driver 206, a trust link may be associated with other components as well. For example, parser 204, interface component 202, Client Side Security 214, Secure CODEC 212, and CCC driver 208, may also include a trust link, substantially similar to trust link 210. Additionally, a trust link substantially similar to trust link 210 may also be included in a remote server, such as employed by content provider 102 of FIG. 1, or the like.

Secure CODEC 212 is described in more detail below in conjunction with FIG. 3. Briefly, however, Secure CODEC 212 may be enabled to authenticate a source of secure content and, based on received entitlements and rights associated with the secure content, to decrypt, and decompress the secure content. Secure CODEC 212 is also configured to decompress content that is received "in the clear." Moreover, Secure CODEC 212 may be configured to communicate the decompressed content to a content rendering device, such as an audio device, graphics device, or the like.

Client Side Security (CSS) 214 may be configured to compare secure timing signals from Secure CODEC 212 with timing signals from system clock 216. By examining the received timing signals, CSS 214 is enabled to determine if tampering may have occurred. Moreover, CSS 214 may be enabled to provide a message to content provider 102 (in FIG. 1), Secure CODEC 212, or the like alerting them of possible tampering.

Figure 3:
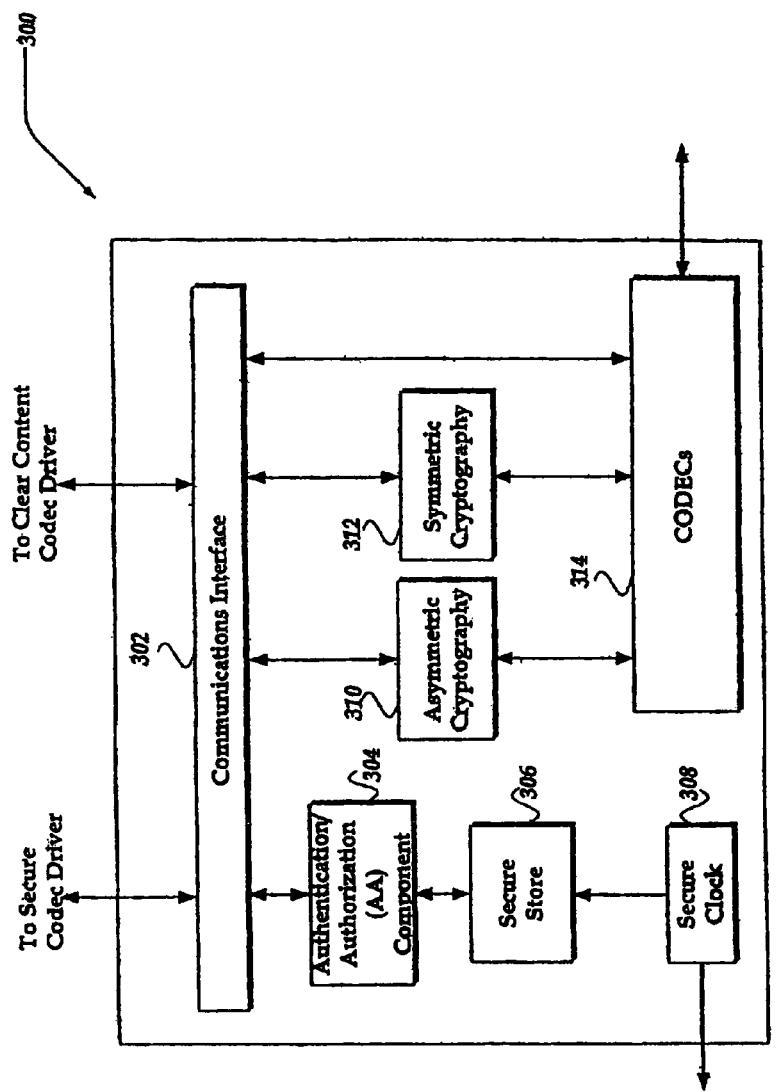
FIG. 3 is a functional block diagram of an embodiment of a secure CODEC as illustrated in FIG. 2 for securely compressing and decompressing digital content.

FIG. 3 is a functional block diagram of an embodiment of a secure CODEC, such as Secure CODEC 212 of FIG. 2, employing components for securely compressing and decompressing digital content. As shown in FIG. 3, secure CODEC 300 includes communications interface 302, Authentication/Authorization (AA) component 304, secure store 306, secure clock 308, asymmetric cryptography 310, symmetric cryptography 312, and CODEC 314.

Communications interface 302 is in communication with AA component 304, asymmetric cryptography 310, symmetric cryptography 312, and CODEC 314. Secure store 306 is in communication with AA component 304, and secure clock 308. Although not shown, secure store 306 may be optionally in communication with asymmetric cryptography 310, and symmetric cryptography 312. Symmetric cryptography 312 is in communication with CODEC 314. Asymmetric cryptography 310 is also in communication with CODEC 314.

Communications interface 302 may be enabled to communicate information between SC driver 206 and CCC driver 208 of FIG. 2, and an appropriate component within secure CODEC 300. In one embodiment, communications interface 302 may employ a trust relationship with other components with which it may communicate. Thus, communications interface 302 may employ a trust link such as described above, to establish, at least in part, the trust relationship. Communications interface 302 may also be configured to manage invocations of the appropriate components within secure CODEC 300.

Authentication/Authorization (AA) component 304 may be configured to provide one-way and two-way authentication, and to determine authorization for access to secure content. AA component 304 is directed to provide verification of an identity of a source of secure content, source of an entitlement and rights of access, as well as verification of an identity of a communicating component, such as Secure CODEC (SC) driver 206, or the like, of FIG. 2. AA component 304 may also be configured to provide information to and receive information from secure store 306. In one embodiment, AA component 304 provides authentication and identity to enable a trust relationship to be established between components. In one embodiment, AA component 304 may provide persistent authentication and identity across power off situations. In one embodiment, the authentication and authorization aspects of AA component 304 may be separate components.

Secure Store 306 may be configured to receive and preserve information associated with the identity of components, sources of information such as content or the like, and entitlements and rights associated with content. Such information may include, but is not limited to, public/private key pairs, X.509 certificates, symmetric keys, fingerprints, source identifiers, content identifiers, as well as rights and entitlement information associated with content, or the like.

Secure clock 308 may be configured to provide timing signals to Client Side Security (CSS) 214 (in FIG. 2) for comparison against system clock 216. Secure clock 308 may also be configured to provide timing signals to secure store 306, and although not shown, to AA component 304, communications interface 302, CODEC 314, asymmetric cryptography 310, and symmetric cryptography 312.

Asymmetric cryptography 310 may be configured to provide public/private key based cryptographic actions. Public/private cryptographic actions include, but are not limited to, key generation, digital signatures, encryption, decryption, and integrity checking. Asymmetric cryptography 310 also enables a secure exchange of encryption/decryption keys. Asymmetric cryptography 310 may be further enabled to receive secure content from communications interface 302, employ information obtained from secure store 306 to decrypt the secure content, and to send the decrypted content to CODEC 314. Virtually any asymmetric cryptographic mechanism may be employed by asymmetric cryptography 310, including, but not limited to Diffie-Hellman, RSA, ElGamal, DSS, Elliptic Curve, Paillier cryptosystems, or the like.

Symmetric cryptography 312 may be configured to provide symmetric or private key based cryptographic actions. For example, symmetric cryptography 312 may be enabled to receive secure content from communications interface 302, employ information obtained from secure store 306 to decrypt the secure content, and to send the decrypted content to CODEC 314. Symmetric cryptography 312 may also be enabled to receive compressed content from CODEC 314, employ information obtained from secure store 306 to encrypt the compressed content, and to send the encrypted content to communications interface 302. Virtually any symmetric cryptographic mechanism may be employed by symmetric cryptography 312, including, but not limited to AES, RC4, SEAL, DES, IDEA, or the like.

CODEC 314 includes any of a variety of compression/decompression mechanisms configured to receive compressed content, decompress it into a digital format capable of being rendered for consumer enjoyment. For example, CODEC 314 may employ Moving Pictures Experts Group (MPEG), Joint Photographic Experts Group (JPEG), wavelets, and other mechanisms for compression and decompression of received digital content. CODEC 314 may also be configured to receive uncompressed digital content and to compress it.

Unlike the present invention, illustrated in FIGS. 2-3, traditional approaches provide CODEC mechanisms, and other security features such as decryption and authentication in physically distinct devices or systems. The present invention has determined that separation of such features and functionalities tend to create security holes and points of attack at the interfaces between the devices or systems. Moreover, traditional approaches may result in communicating content between the security features virtually 'in the clear,' and unprotected. Additionally, security features in traditional approaches typically are not enabled to establish trust relationships between each other, thereby increasing their exposure to hacking, spoofing, and piracy of content.

The present invention is directed at addressing the above-mentioned shortcomings, disadvantages and problems by, among other actions, integrating the security features, as described above.

Generalized Operation

Figure 4:
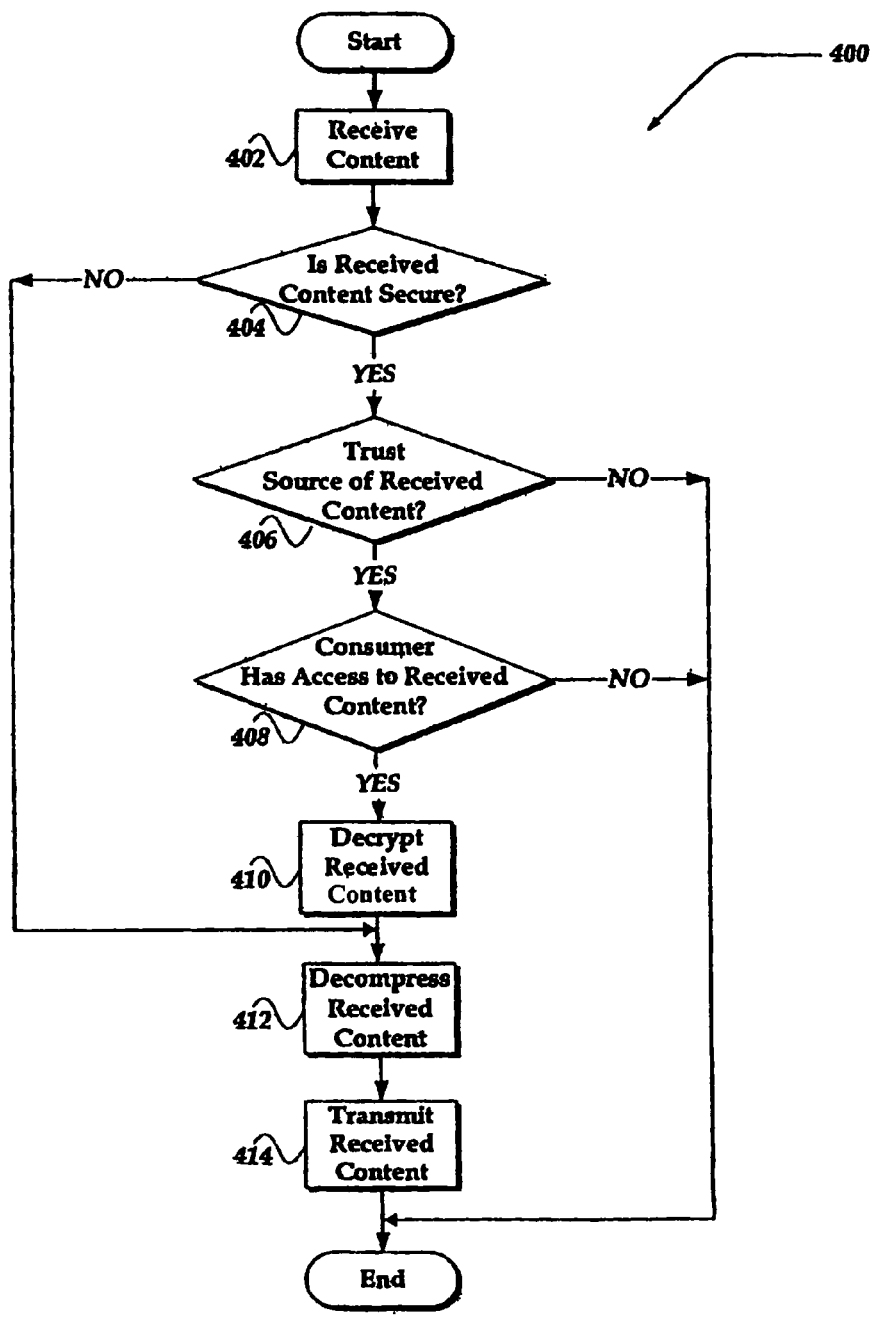
FIG. 4 illustrates a flow diagram generally showing one embodiment of a process for securely decompressing content, in accordance with aspects of the invention.

FIG. 4 illustrates a flow diagram generally showing one embodiment of a process for securely decompressing content, in accordance with aspects of the invention. Process 400 may be employed within system 200 shown in FIG. 2.

As shown in FIG. 400, after a start block, the process moves to block 402, where digital content is received. The process then proceeds to decision block 404, where a determination is made whether the received content is secure.

At decision block 404, if it is determined that the received content is not secure, the process flows to block 412. Alternatively, if, at decision block 404, it is determined that the received content is secure, the process proceeds to decision block 406.

At decision block 406, a determination is made whether a source associated with the received content is trusted. In one embodiment, the received content is digitally signed by the source associated with the content. A public key associated with the source is employed to authenticate the source and to determine the integrity of the received content. However, the invention is not constrained to using public keys. For example, the received content may be signed, or encrypted using a shared private key, or the like, without departing from the scope or spirit of the invention. In any event, if, at decision block 406, it is determined that the authentication of the source, or the integrity of the received content, is invalid, the process moves to an end block and returns to performing other actions. Authentication or integrity of the source may be invalid for a variety of reasons, including, but not limited to an invalid or expired X.509 certificate, non-matching public/private key pairs, incorrect shared private key, expired Certification Authority's signature, received content that may have been tampered with, or the like. In one embodiment, a message, or other signal may be sent to perceived content owner for the received content, a device owner, or the like, indicating that the system is unable to authenticate the source of the content.

Alternatively, if, at decision block 406, it is determined that the authentication of the source and the integrity of the received content is valid, the process moves to decision block 408, where a determination is made whether a consumer has access to the received content. Determination of access to the received content includes, but is not limited to, an analysis of received entitlements and rights associated with the received content.

If, at decision block 408, it is determined that the consumer is not authorized to access the secure content by, due to such as the entitlements and/or rights associated with the secure content, the process moves to an end block and returns to performing other actions. In one embodiment, a message, or the like, may be provided to the consumer indicating that access to the secure content is denied. Alternatively, if it is determined that the consumer is authorized to access the received content, the process proceeds to block 410.

At block 410, the received content is decrypted employing symmetric encryption keys, asymmetric encryption keys, or a combination of symmetric and asymmetric encryption keys. Upon completion of block 410, the process proceeds to block 412.

At block 412, the received content is decompressed employing any of a variety of decompression mechanisms capable of providing content that may be rendered. For example, block 412 may employ Moving Pictures Experts Group (MPEG), Joint Photographic Experts Group (JPEG), wavelets, and other mechanisms for compression and decompression of received content. Upon completion of block 412, the process proceeds to block 414, where the decompressed content is sent to at least one other process to render it for consumer enjoyment. Next, the process moves to an end block, where the process may then return to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus for securely providing digital content, comprising:
 a processor having executable components, including:
  an interface component that is configured to receive digital content;
  a secure clock providing a secure timing signal representative of a periodic pulse;
  a client side security component in communication with the secure clock performing actions, including:
   receiving a system timing signal representative of another periodic pulse from a system clock;
   receiving the secure timing signal from the secure clock; and
   determining if the digital content has been tampered with based on a comparison of the system timing signal and the secure timing signal; and
  an authentication component in communication with the interface component and the client side security component, and that is arranged to perform actions, including:
   determining if a source of the digital content is authentic;
   determining if access to the digital content is authorized, based on a digital right and an entitlement;
   establishing a trust relationship between the authentication component and the client side security component and establishing a different trust relationship between the authentication component and the interface component;
receiving the digital content tamper determination from the client side security component based on the trust relationship and receiving the digital content from the interface component based on the different trust relationship; and
if the digital content has not been tampered with, the source is authentic, and access to the digital content is authorized, enabling the digital content to be securely decompressed.

2. The apparatus of claim 1, further comprising a secure store configured to include at least one of an encryption key, a trust key, a source identifier, the entitlement, or the digital right.

3. The apparatus of claim 1, further comprising a communications interface that is configured to receiving the digital content over a network and to send the digital content towards the authentication component through a trust link.

4. The apparatus of claim 1, further comprising:
a secure compression/decompression (CODEC) that is configured to securely receive the digital content from the interface component and to decompress the digital content.

5. The apparatus of claim 4, wherein the secure CODEC employs a secure trust relationship with the interface component to receive the digital content.

6. The apparatus of claim 1, wherein the received digital content is encrypted.

7. The apparatus of claim 1, wherein the apparatus is operable to connect with at least one of a television, a digital recorder, set-top box, mobile device, or a jukebox.

8. A consumer entertainment device, comprising:
a computer processor for executing instructions; and
a memory storing instructions that when executed by the processor perform actions including:
establishing a trust relationship between a secure Compresser/DECompresser (CODEC) and a client side security component and establishing a different trust relationship between the CODEC and an interface component;
receiving digital content at the CODEC from the interface component based on the different trust relationship;
authenticating a source of the digital content;
receiving a system timing signal representative of a periodic pulse from a system clock;
receiving a secure timing signal representative of another periodic pulse from a secure clock;
determining, at the client side security component, if the digital content has been tampered with based on a comparison of the system timing signal and the secure timing signal;
providing the digital content tamper determination from the client side security component to the CODEC based on the trust relationship; and
if access to the digital content is allowed based, in part, on a right and an entitlement associated with a user, authentication of the source, and determining the digital content has not been tampered with, then decrypting the digital content and securely decompressing the decrypted digital content using the CODEC, wherein an entitlement associated with the user includes a set of one or more rights sent from a content distributor to the user.

9. The consumer entertainment device of claim 8, wherein the secure CODEC receives the digital content using a secure trust link.

10. The consumer entertainment device of claim 9, wherein authenticating the source further comprises:
determining a validity of at least one of a digital signature associated with the source of the digital content, a digital certificate, or a key.

11. The consumer entertainment device of claim 8, the memory further storing instructions that when executed by the processor perform actions comprising:
receiving the right or entitlement in an encrypted format.

12. The consumer entertainment device of claim 8, the memory further storing instructions that when executed by the processor perform actions comprising:
if the source is unauthenticated, inhibiting decryption and decompression of the digital content.

13. A system for use in providing digital content, comprising:
a processor having executable components, including:
a parser that is configured to perform actions, including:
receiving digital content;
if the received digital content is unencrypted, providing the unencrypted digital content to a clear content CODEC to be decompressed; and
if the received digital content is encrypted, providing the encrypted digital content to a secure CODEC;
a client side security component in communication with the secure CODEC, and configured to perform actions, including:
receiving a timing signal representative of a periodic pulse from a system clock;
receiving a secure timing signal representative of another periodic pulse from a secure clock contained within the secure CODEC; and
determining if the digital content has been tampered with based on a comparison of the system timing signal and the secure timing signal;
the secure CODEC being in communication with the parser, and configured to perform actions, including:
establishing a trust relationship between the secure CODEC and the parser and establishing a different trust relationship between the secure CODEC and the client side security component;
receiving the encrypted digital content securely through a trust link based on the trust relationship and receiving the digital content tamper determination from the client side security component based on the different trust relationship;
authenticating a source of the encrypted digital content;
determining a right and an entitlement associated with the digital content; and
if the source is determined to be authentic, the right and the entitlement enables access to the digital content, and the digital content has not been tampered with, then the secure CODEC decrypting the digital content and decompressing the unencrypted digital content.

14. The system of claim 13, wherein authenticating the source further comprises:
determining a validity of at least one of a digital signature associated with the source of the digital content, a digital certificate, or a key.

15. The system of claim 13, wherein establishing the trust link further comprises employing at least one of a digital encryption/encryption key, a hash, or a digital certificate.

16. The system of claim 13, wherein the secure CODEC further comprises:
 an authentication component configured to determine authentication of a source and access to the digital content based, in part, on the right and entitlement; and
 an at least one cryptographic component configured to receive and to decrypt encrypted digital content.

17. A device for use in providing digital content, comprising:
 a transceiver that is configured to receive digital content;
 a processor having executable components, including:
  an authentication component to perform actions, including:
   securely determining authentication of a source of the digital content;
   securely determining a right or entitlement associated with a use of the digital content;
  a client side security component to perform actions, including:
   securely detecting tampering by comparing a system timing signal representative of a periodic pulse received from a system clock to a secure timing signal representative of another periodic pulse received from a secure clock; and
  a decryption and decompression component to perform actions, including:
   establishing separate trust relationships between the decryption and decompression component and each of the transceiver, the client side security component, and the authentication component;
   enabling the digital content to be securely decrypted and decompressed, if it is determined that the source of the digital content is authentic, the right or entitlement enables the use of the digital content, and the digital content has not been tampered with.

18. The device of claim 17, wherein enabling the digital content to be securely decrypted and decompressed further comprises a means for establishing a trusted relationship with at least one other component of the device.

19. The apparatus of claim 1, wherein the authentication component is arranged to perform further actions, including:
 establishing the trust relationship between the authentication component and the client side security component using a first encryption/decryption mechanism; and
 receiving the digital content tamper determination from the client side security component based on the trust relationship using a second encryption/decryption mechanism.

* * * * *